United States Patent Office 3,696,058
Patented Oct. 3, 1972

3,696,058
PROCESS FOR POLYMER RECOVERY
John Teti, Wilmington, Del., assignor to E. I. du Pont de Nemours and Company, Wilmington, Del.
No Drawing. Filed June 10, 1971, Ser. No. 151,900
Int. Cl. C08f 47/24; C08g 53/22
U.S. Cl. 260—2.3                    5 Claims

ABSTRACT OF THE DISCLOSURE

A process for recovering solid scrap thermoplastic polymer such as polyamides, polyesters, polyacrylonitriles and polyacetals by dissolving the polymer in hexafluoroisopropanol, filtering the polymer solution, mixing the polymer solution with an excess of water at 60° to 100° C. and separating the precipitated polymer from the aqueous mixture.

BACKGROUND OF THE INVENTION

(1) Field of the invention

This invention relates to a process for recovering scrap thermoplastic polymers. More specifically, this invention relates to a process for recovering scrap thermoplastic polymers by first dissolving in a special solvent hexafluoroisopropanol.

(2) Prior art

The consumption and production of thermoplastic polymers are greater than ten billion pounds per year. Some, such as polyethylene, polypropylene, polyvinylchloride, polystyrene, polyamides and polyester, surpass the billion pounds per year rate. Use of relatively expensive thermoplastic polymers such as those used in synthetic fibers has also increased tremendously. For example, it has been estimated that the world's consumption of synthetic fibers will reach some 12 million metric tons (26 billion pounds) by the year 1980, of which 4.6 million metric tons would constitute polyester fibers, 4.1 million metric tons would be polyamide fibers and 2.3 million metric tons will be polyacrylic fibers (Chemical and Engineering News, Feb. 2, 1970, p. 22).

As is well known, in the processing of thermoplastic polymers such as in melt spinning, molding, extrusion and the like, certain portions of the polymer (5–50%, depending upon the operation) end up as scrap polymer either in the form of rejected article, or in the sprues and runners in the molding process. In many operations such as in molding and extrusion, the scrap polymer may be recycled by blending with virgin polymer and thus recovered.

In the processing of thermoplastic polymers in the molten state, heating of the polymer and particularly heating over a prolonged period may cause degradation of the polymer either by thermal degradation or oxidative degradation. Such partially degraded polymers may be recovered by recycling by blending with virgin polymer in some operations. The amount recycled may be limited by the use of the polymer and the degree of degradation. The use of partially degraded polymer is, however, unacceptable in the production of synthetic fibers wherein highly uniform molecular weights and quality are required to maintain the desirable fiber characteristics.

Art processes have not satisfactorily produced recovered scrap polymer which is directly useable, for example, in the synthetic fiber production. Thus, for example, in recently issued U.S. Pat. 3,501,420, scrap polyester, such as polyethyleneterephthalate, is recovered by depolymerization in the presence of $C_2$ to $C_{10}$ aliphatic alcohols at a temperature above 125° C. and then catalytically hydrogenating with hydrogen, to form a depolymerized product which may then be repolymerized to form a polyester.

It is an objective of this invention to provide a scrap polymer recovery process. It is a further object to provide a scrap polymer recovery process which provides recovered polymer free of degraded polymer. Another object is to provide a recovery process for polyamides, polyesters, polyacrylonitriles and polyacetals. It is still a further object to provide a scrap polymer recovery process which is simple, convenient and relatively inexpensive. These and the other objects of the invention will be apparent in the disclosure which follows.

SUMMARY OF THE INVENTION

Now in accordance with the invention a process for recovering solid scrap thermoplastic polymer has been found which comprises the steps of:

(1) dissolving said thermoplastic polymer in hexafluoroisopropanol,
(2) filtering said polymer solution,
(3) mixing the polymer solution with an excess of water at a temperature of from 60° to 100° C. and
(4) separating the precipitated polymer from the water.

As a further illustration of the process of this invention, it has been found that solid scrap thermoplastic polymer selected from the group consisting of polyamide, polyester, polyacrylonitrile and polyacetal was recovered by the process which comprises:

(1) dissolving said thermoplastic polymer in hexafluoroisopropanol,
(2) filtering said polymer solution,
(3) mixing the polymer solution with an excess of water at a temperature of from 60° to 100° C. to precipitate the polymer and evaporate the hexafluoroisopropanol and
(4) separating the precipitated polymer from the water.

The process of this invention therefore comprsies the steps of:

(1) dissolving said scrap, thermoplastic polymer in hexafluoroisopropanol,
(2) filtering said polymer solution,
(3) mixing the polymer solution with an excess of water at a temperature of 60° to 100° C. and
(4) separating the precipitated polymer.

The present invention provides a process for recovering scrap thermoplastic polymers which is efficient and economical. The process is particularly useful for the recovery of scrap polyamides, polyesters, polyacrylonitriles and polyacetals. The process of this invention offers a unique method for the recovery of scrap polymers and is also unique in that the recovered polymers may be upgraded in quality. In some areas of application, after filtration to remove degraded polymer the polymers dissolved in the hexafluoroisopropanol do not have to be separated. Such applications are in forming polymer films wherein the polymer solution is cast on a substrate and the solvent allowed to evaporate, impregnating porous materials such as paper and textile fabrics with the polymer, dry spinning of fibers or solution spinning of fibers. However, as described herein, the polymer may be also readily obtained free of solvent, to be used in any desired application.

The process of the present invention is useful for the recovery of scrap, thermoplastic polymers such as polyacrylates (polymethacrylates and polyacrylates), cellulosics (cellulose acetate, cellulose propionate), polyurethanes, and vinyls (polyvinylacetate, polyvinylchloride), and particularly polyamides, polyesters, polyacrylonitriles and polyacetals. The process is particularly useful for those thermoplastic polymers such as polyamides, polyesters, polyacrylonitriles and polyacetals because they are relatively expensive polymers. The recovered thermoplastic polymers are useful in the preparation of fibers, film, molded goods and extended goods. The process of this invention is also applicable to recovery of thermoplastic polymers that are blends such as for example a blend of polyamide with a polyester. The polyamide-polyester for example while in solution may be spun to give a mixed polymer of improved quality.

A polyamide is defined as a synthetic, linear condensation-type polymer whose repeating units contain the amide group

these groups being integral members of the linear polymeric chain. Polymers of this type are well known in the art. Polyamides may be derived from dibasic acids such as oxalic, succinic, adipic, suberic, and sebacic acids and diamines such as ethylenediamine, pentamethylenediamine, hexamethylenediamine, decamethylenediamine, tetradecamethylenediamine, and di(p-aminocyclohexyl)methane. Polyamides may also contain one or more aromatic groups either in their acid portion or their amine portions as, for example, in poly(p-phenylene terephthalamide) or poly(m-phenylene isophthalamide). Polyamides may also be derived from monoaminomonocarboxylic acids or their cyclic lactams, typical examples being polycaprolactam or poly(aminodecanoic acid). Polyamides as used herein include copolymers containing repeating units of two or more different kinds such as for example those present in copolyesteramides or copolyamide urethanes provided that at least two-thirds of the repeating units are the above defined amide linkage

Other representative examples include poly(pentamethylene adipamide), poly(octamethylene adipamide), poly(decamethylene adipamide), poly(pentamethylene suberamide), poly(hexamethylene suberamide), poly(decamethylene suberamide), poly(pentamethylene sebacamide), poly(hexamethylene sebacamide), poly(octamethylene sebacamide), poly(caproamide), poly(hexamethylene adipamide), poly[bis-(p - cyclohexylene) methane adipamide], poly[bis(para - cyclohexylene)methane azelamide], poly(pentamethylene terephthalamide), poly(hexamethylene terephthalamide), poly(m-phenylene adipamide), poly(p-phenylene adipamide), etc.

A polyester is defined as synthetic linear condensation-type polymer whose repeating units contain the ester group,

these groups being integral members of the linear polymer chain. Polyesters are also well known in the art. Polyesters may be those derived from aliphatic dibasic acids such as oxalic, succinic, glutaric, adipic, and sebacic acids and glycols such as ethylene glycol, propylene glycol, trimethylene glycol, hexamethylene glycol and decamethylene glycol. Polyesters may also be derived from aromatic dicarboxylic acids such as terephthalic acid and isophthalic acid and glycols such as ethylene glycol. Polyesters may also be derived from hydroxy acids and their corresponding lactones such as those from hydroxypivalic acid, α-hydroxyisobutyric acid, ω-hydroxycaproic acid, ω-hydroxydecanoic acids, γ-butyrolactone and 4-hydroxyhexanoic acid lactone. Polyesters as used herein include copolymers containing repeating units of two or more different kinds such as in copolyesteramide provided that at least two-thirds of the repeating units are the above-defined ester linkages

Representative examples include poly(ethylene terephthalate), poly(trimethylene terephthalate), poly(tetramethylene terephthalate), poly(ethyleneisophthalate), poly(octamethylene terephthalate), poly(decamethylene terephthalate), poly(pentamethylene isophthalate), poly(tetramethylene isophthalate), poly(hexamethylene isophthalate), poly(hexamethylene adipate), poly(pentamethylene adipate), poly(pentamethylene sebacate), poly(hexamethylene sebacate), poly(1,4 - cyclohexylene adipate), poly(1,4-cyclohexylene sebacate), poly(ethylene terephthalate-co-sebacate), and poly(ethylene-co-tetramethylene terephthalate).

A polyacrylonitrile is defined as linear addition-type polymer containing at least 85% by weight of polymerized acrylonitrile. Such polyacrylonitriles include in addition to the polyacrylonitrile homopolymer, acrylonitrile copolymers wherein at most 15% by weight of the polymers comprise esters, nitriles and amides of acrylic and 1-alkylacrylic acid such as methyl methacrylate, methyl acrylate, ethyl acrylate, methacrylonitrile, acrylamide, butylmethacrylate, butylacrylate; chloro- and fluoroolefins such as vinyl chloride, vinyl fluoride, vinylidene chloride, vinylidene fluoride, chlorotrifluoroethylene, tetrafluoroethylene; vinyl carboxylates such as vinyl acetates or vinyl butyrate; ethylenically unsaturated hydrocarbons such as styrene, isobutylene or 1,3-butadiene; ethylenically unsaturated carboxylic or sulfonic acid such as acrylic acid, methacrylic acid or styrenesulfonic acid.

A polyacetal is defined as synthetic, high molecular weight, linear polymer containing acetal oxygen as integral part of the linear polymeric chain. These polymers are characterized by the presence of the repeating acetal unit

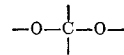

Polyoxymethylene, a polyformaldehyde and particularly polyoxymthylene stabilized by acylation of the terminal hydroxyl groups are well known. Polyacetals as used herein include not only polymers containing solely acetal units but also polymers containing different repeating units provided that at least two-thirds of the repeating units are acetal units. Representative examples include poly(formaldehyde), poly(acetaldehyde), poly(propionaldehyde), poly(butyrlaldehyde), poly(benzaldehyde), and poly(chloral).

In a polymer recovery process utilizing a solvent, the solvent must meet the following requirements if the process is to be practical and economical: (1) availability, (2) high solubility for polymer, particularly at non-elevated temperature and (3) easy removal and recovery of the solvent. The solvent of this invention not only meets these requirements but quite unexpectedly also has selective solubility for undegraded polymer.

Known solvents for the thermoplastic polymers of particular interest in this invention such as polyamides, polyesters, polyacrylonitriles and polyacetals are limited in number. Polyamides are known to dissolve in formic acid (B.P. 100.7° C.), cresols (B.P. 191.5–202.5° C.), and phenol (B.P. 182° C.). Polyester such as poly(ethylene terephthalate) is soluble in such solvents as m-cresol (B.P. 202.8° C.), trifluoroacetic acid (B.P. 73° C.), o-chlorophenol (B.P. 176° C.), a mixture of three parts of trichlorophenol (B.P. 244° C.) and ten parts phenol (B.P. 182° C.) and a mixture of two parts tetrachloroethane (B.P. 146° C.) and three parts phenol (B.P. 182° C.). Polyacrylonitrile is soluble in N,N-dimethylformamide (B.P. 153° C., N,N-dimethylacetamide (B.P. 166° C.), dimethylsulfone (B.P. 238° C.), dimethylsulfoxide (B.P. 100° C. with decomp.), γ-butyrolactone (B.P. 206°

C.) and nitrophenols (B.P. 214–280° C.). Availability of solvent for polyacetals is even more limited. As the following table from "Encyclopedia of Polymer Science and Technology" Interscience Publishers, N.Y. 1964, vol. 1, p. 619 shows, fairly elevated temperatures are required to dissolve the polymer and to maintain the polymer solutions for poly(oxymethylene). In the table "Solution Temperature" is the lowest temperature at which 1% solution of the polymer can be formed and the "gel temperature" is the lowest temperature at which a solution can be kept without separation of gel.

| Solvent | Solution temp., ° C. | Gel temp., ° C. |
| --- | --- | --- |
| m-Chlorophenol (B.P. 214° C.) | 89 | 54 |
| Phenol (B.P. 182° C.) | 109 | 55 |
| p-Chlorophenol (B.P. 217° C.) | 98 | 68 |
| 2,4-xylenol (B.P. 211.5° C.) | 128 | 80 |
| Aniline (B.P. 184.4° C.) | 130 | 108 |
| $\gamma$-Butyrolactone (B.P. 206° C.) | 134 | 112 |
| N,N-dimethylformamide (B.P. 153° C.) | 135 | 112 |
| Pentachloroethane (B.P. 162° C.) | 140 | 115 |
| Benzyl alcohol (B.P. 205.2° C.) | 132 | 117 |
| Formamide (B.P. 210.7° C.) | 150 | 139 |
| Nitrobenzene (B.P. 210.9° C.) | 148 | 130 |
| Cyclohexanol (B.P. 161.5° C.) | 150 | 144 |
| Propionic anhydride (B.P. 169.3° C.) | 155 | 140 |

Thus the solvents for polyamides, polyesters, polyacrylonitriles and polyacetals discussed above, have deficiency either in low solubility for the polymers or in difficulty in removal from the polymer solution as indicated by their boiling points. When prolonged heating is required either in dissolving the polymer or in removing the solvent from the polymer solution, possibility of additional oxidative or thermal degradation of the polymer is introduced.

It has now been found that efficient and economical recovery of scrap thermoplastic polymers and particularly the recovery of scrap polyamides, polyesters, polyacrylonitriles and polyacetals may be carried out by the steps of (1) dissolving the polymer in hexafluoroisopropanol, (2) filtering the polymer solution to remove degraded polymer and impurities, (3) adding an excess of water to precipitate the polymer and mixing the precipitated polymer in a water bath at 60° to 100° C. to recover the hexafluoroisopropanol and (4) separating the precipitated polymer.

Hexafluoroisopropanol, $(CF_3)_2 CHOH$, has recently become available through catalytic hydrogenation of hexafluoroacetone as described by Middleton in U.S. Pat. 3,418,337 or by improved hydrogenation process of copending application of K. H. Lee, Ser. No. 811,668, filed Mar. 28, 1969, assigned to the common assignee. Hexafluoroisopropanol is a water-white liquid of M.P. $-3.4°$ C., B.P. 59° C., $n_D$ 1.2752, specific gravity of 1.59, surface tension of 16.3 dynes/cm. at 25° C. and is soluble in water.

Most of the polyhaloalcohols disclosed in U.S. Pats. 3,227,647 and 3,245,944 are good solvents for polyamides, polyesters and polyacetals but are not suitable in the process of this invention because of the difficulty in removal from the polymer solution due to relatively high boiling points.

The polymer solution obtained in the process of the present invention by dissolving the scrap thermoplastic polymers in hexafluoroisopropanol should be in the range of from about 5% to 30% by weight. While the polymers in general are soluble in hexafluoroisopropanol to greater than 30%, solutions of polymer of greater than 30% generally have viscosities which are too high for practical handling while solutions of polymers of less than 5% result in less economical process because of necessity of handling and recovering excessive amounts of solvents. Polymer solutions of from about 20% to about 25% are preferred. The hexafluoroisopropanol used as solvent may be substantially pure hexafluoroisopropanol but hexafluoroisopropanol containing up to about 10% by weight of other liquids such as water, alcohol and the like are useable. The preferred hexafluoroisopropanol has at least 95% hexafluoroisopropanol. Usually the dissolution of polymers in hexafluoroisopropanol is carried out at ambient temperature but if desired, the solution may be prepared at a slightly elevated temperatures such as 40° to 59° C. One of the important features of this invention is that the solutions of polymers may be prepared at relatively low temperature, thus avoiding any further oxidative or thermal degradation of the polymer.

The polymer solution is then filtered. One of the unexpected features of this invention is the discovery that hexafluoroisopropanol has selective solubility for undegraded polymers. Thus it has been found, for example, when polyamides or polyesters which have become partially degraded through thermal processing, are dissolved in hexafluoroisopropanol, they form a solution of undegraded polymer leaving the degraded polymer undissolved. By filtering the polymer solution, it is possible to separate the undegraded polymer from the degraded polymer. The upgrading of scrap polymers by separating undegraded polymer from degraded polymer by selective solubilization of undegraded polymer is believed to be unknown in the art. The filtration of the polymer solution also serves to remove solid pigments, dirt and other solid contaminates present with scrap polymers. The degraded portion of the thermoplastic polymers of this invention are insoluble in hexafluoroisopropanol.

The three most important types of polymers of this invention used for spinning of fibers are polyamides, polyesters and polyacrylonitriles. In the oxidative and/or thermal degradation of polyamides, polyesters and polyacrylonitriles, insoluble gel particles are formed by a cross-linking process. The presence of such gel particles make such polymers unsuitable for the spinning and the drawing of fibers. The presence of gel particles makes the spinning of fibers very difficult. Moreover, if the polymers containing gel particles are spun into fibers, such fibers will lead to difficulty in the drawing operation since the portion of the fiber containing such gel particles will have different drawabality and other physical characteristics from the rest of the fiber. Thus, it is highly desirable that a process for the recovery of scrap polyamides, polyesters and polyacrylonitriles, particularly when such polymers are to be used in the production of fibers, by a process which can recover good useable polymers from the mixture containing degraded polymer. The process of the present invention, by selectively dissolving the undegraded polyamides, polyesters, and polyacrylonitriles, but leaving undissolved the gel particles formed in the oxidative and/or thermal degradation of the polymers, can recover these polymers in the quality suitable for the production of fibers.

In the next step the polymer is recovered by separating the solvent, hexafluoroisopropanol, from the polymer solution. The polymer is separated from the filtered polymer solution by mixing the polymer solution in an excess of water, sufficient to cause the polymer to precipitate. Since the hexafluoroisopropanol is soluble in the water, the polymer precipitates and is removed by filtration and the hexafluoroisopropanol recovered from the water by distillation. The temperature of the water should be from 60° to 100° C. to maximize the evaporation of the hexafluoroisopropanol. However, a temperature of about 100° C. is preferred. Hexafluoroisopropanol may also be removed by introducing the polymer solution in a fine stream into well-agitated water at a temperature of 60° to 100° C. In such a procedure, a part of hexafluoroisopropanol is evaporated while a part is dissolved in the water. The proportion of the solvent evaporated to the solvent dissolved depends upon the temperature of the water. It is clear that as the temperature of the water is increased, greater portion of the solvent is evaporated. In order to keep the portion of the solvent that evaporates at a maximum, the water should be at around 100° C. and preferably steam is sparged into the water. When the polymer solution is introduced into water at around 100° C., the polymer is usually recovered as "strings." However, when the polymer stream is not fine enough or when the agitation is inadequate, the polymer may be obtained as lumps. Removal of hexafluoroisopropanol or water enclosed within the polymer lumps then becomes difficult. The efficiency of the separation of hexafluoroisopropanol from the dissolved polymer is improved by mixing a stream of polymer solution with a stream of steam in a two-fluid mixing nozzle. In this embodiment hexafluoroisopropanol is substantially instantly evaporated and the polymer is obtained as porous polymer crumb. Two-fluid mixing nozzles are well known in the art, and may be any desired design or construction. It is understood that in the term "two-fluid," the polymer solution is one of the fluids while the second fluid is steam which may or may not be mixed with water. The pressure of steam entering the two-fluid mixing nozzle should be in the range of from about 15 p.s.i.g. to about 135 p.s.i.g. Steam pressures below about 15 p.s.i.g. produce polymer crumbs which are more difficult to dry while steam pressures greater than about 135 p.s.i.g. serve no useful purpose. The ratio of steam to the polymer solution depends upon the concentration of the polymer solution but generally from about 1 to 10 parts of steam per part of polymer solution is satisfactory.

The effluent from the two-fluid nozzle comprising volatilized hexafluoroisopropanol, polymer crumb and water is mixed with a further amount of water and introduced into an agitated vessel containing water in the temperature range of 60° to 100° C. In the agitated stripping vessel, further amount of hexafluoroisopropanol is removed from the polymer crumbs. The temperature of the water must be higher than 60° C. to volatilize hexafluoroisopropanol (B.P. 59° C.) and is preferably at around 100° C. The temperature of the water may be maintained by such means as external heating jacket, internal heating coils or by steam sparging into the water bath. It is preferable to maintain the water at about 100° C. not only to improve volatilization of hexafluoroisopropanol from the polymer crumb but also to minimize the loss of hexafluoroisopropanol by solution in water. By maintaining the water temperature at around 100° C. the water will contain less than 0.3% by weight, usually less than 0.1% by weight of hexafluoroisopropanol. It should be desirable to employ a second vessel to remove still further amounts of the solvent from the polymer. The second vessel will allow less dwell time of the crumb in water and hence increase throughput of product. The quantity of hexafluoroisopropanol removed will not only depend on temperature of water but exposure time of crumb to the water. Equilibrium of water, hexafluoroisopropanol and crumb will occur at a much lower hexafluoroisopropanol content in the second vessel for a given rate of throughput.

The volatilized hexafluoroisopropanol is recovered from the stripping vessel by fractionation in a distillation column and then recycled. While most of the solvent is volatilized in the two-fluid mixing nozzle, maintaining the water in the stripping vessel at around 100° C. assures substantially complete volatilization of hexafluoroisopropanol.

The polymer crumb-water mixture is then taken from the stripping vessel and water is separated from the polymer crumbs by any conventional means such as filtration, centrifugation and the like. The separated water is recycled in the process, back to the stripping tube wherein it is mixed with the effluent from the two-fluid nozzle. The separated polymer crumb may be further processed, such as drying, to obtain recovered polymer useful in polymer fabrication.

It is clear to anyone skilled in the art that the above-described process for the recovery of scrap polymer may be carried out batch-wise or continuously.

In the examples that follow, all percentages are by weight unless otherwise stated.

Example 1.—Scrap polyamide (nylon), poly(hexamethyleneadipamide) obtained from melt spinning operation was dissolved in hexafluoroisopropanol to form a 10% solution (w./w.) at room temperature. Dissolution took place readily and the polymer solution was filtered to remove dirt and some undissolved material.

In a five liter resin flask equipped with a dropping funnel, agitator, a steam inlet tube and a thermometer was placed approximately 1500 ml. of distilled water. Distilled or deionized water should be used since the presence of metallic ions, such as ferric ions, in ordinary water may discolor the recovered polymer. The resin flask is also provided with an opening such that volatilized solvent and steam may freely escape. The water in the flask was heated to 98° C. by means of a hot plate placed directly under the flask. After the water had reached 98° C., steam was introduced into the flask, the outlet of the steam tube being placed below the surface of the water. The hexafluoroisopropanol polyamide solution was then added to the agitated water over a period of 15–20 minutes. Throughout the addition of the polyamide solution, the temperature of the water bath was maintained at 97° to 98° C. After all of the polyamide solution was added, agitation was continued for an additional 10 minutes, keeping the water temperature at 98° to 100° C. Evolution of hexafluoroisopropanol began immediately upon the addition of the polyamide solution and after the ten minute period of agitation after the completion of the polymer solution addition, evolution of hexafluoroisopropanol had ceased as indicated by the absence of characteristic odor. The polymer suspension in water was cooled to 50° to 60° C. and filtered. Polyamide was recovered as shreds with the natural light cream color of virgin polyamide.

Example 2.—Using the procedure as described in Example 1, scrap polyethylene terephthalate was treated and recovered to give practically white polymer.

Example 3.—Using the procedure as described in Example 1, scrap polyacrylonitrile in the form of fiber was treated and recovered to give practically white polymer.

Example 4.—Using the procedure as described in Example 1, scrap polyacetal resin was recovered to give practically white polymer.

Example 5.—Polyamide recovered in Example 1 was dissolved in hexafluoroisopropanol to form a 20% solution. Fibers were produced from the above solution by dry spinning using nitrogen gas at 65° to 70° C. to remove the solvent. The fibers were of acceptable quality. The fibers were also drawn (3½×) at 140° to 150° C.

Recovered polyamide from Example 1 was also melt spun into satisfactory fibers and drawn.

As is well known, presence of gel particles formed by oxidative or thermal degradation of polyamides cause defects in the spinning and drawing of fibers. Comparison of analytical data also indicate that the present scrap polyamide recovery process result in upgraded polyamide. Thus, the original scrap polyamide had a relative viscosity of 32.5, amine end groups content of 39.8 (equivalent per $10^6$ g.), carboxyl end group content of 90.7 (equivalent per $10^6$ g.) while the recovered polyamide had relative viscosity of 34.0, amine end group content of 18.8 and the carboxyl end group content of 104.8.

Example 6.—Scrap, discolored polyester (polyethylene terephthalate) X-ray film, 10 g., was cut into pieces of approximately one half inch square and placed in a beaker with 100 ml. of 3% sodium hydroxide solution and heated at 100° C. for 30 minutes. The polyester pieces were removed and washed with water. The dried polyester pieces were then added to 200 g. of hexafluoroisopropanol. Some of brown discolored resin did not dissolve. The polymer solution was filtered giving an almost colorless solution of polyester in hexafluoroisopropanol. The polyester was recovered from the solution as described in Example 1 to give very slightly discolored polyester.

Example 7.—A 20% solution of scrap polyamide (nylon 66), poly(hexamethylene adipamide) was prepared in a solution tank from 0.9 kg. (2 lbs.) of polyamide and 3.63 kg. (8 lbs.) of hexafluoroisopropanol of 95% purity (5% water). The polyamide solution was readily prepared at ambient temperature. The polymer solution was pumped through a filter and into a two-fluid nozzle at 25° C. at the rate of approximately 40–50 ml. per minute where the polymer solution was contacted with steam at 70 p.s.i.g. (150° C.) introduced at the rate equivalent to the amount of water of 0.9 kg./min. The effluent from the two-fluid nozzle was mixed with water at around 99° C. The polymer crumbs were separated from the gross water on a dewatering screen. The moist polymer crumbs recovered from the screen contained approximately 3 parts of water per part of polymer and approximately 0.02 part of hexafluoroisopropanol per part of polymer. It is clear that by using a pressure or vacuum filtration to separate water from the polymer crumbs instead of a screen, the ratio of water to the polymer can be reduced markedly. The polymer crumbs obtained were in such subdivision and porosity that water was very readily removed in a drying oven. The recovered polymer crumbs were white.

The foregoing detailed description has been given for clarity of understanding only and no unnecessary limitations are to be understood therefrom. The invention is not limited to exact details shown and described for obvious modifications will occur to one skilled in the art.

What is claimed is:
1. A process for recovering solid scrap thermoplastic polymer which comprises the steps of:
   (a) dissolving said thermoplastic polymer in hexafluoroisopropanol,
   (b) filtering said polymer solution,
   (c) mixing the polymer solution with an excess of water at a temperature of from 60° to 100° C. and
   (d) separating the precipitated polymer from the water, wherein the thermoplastic polymer is selected from the group consisting of polyamide, polyester, polyacrylonitrile and polyacetal.
2. The process of claim 1 wherein the thermoplastic polymer is poly(ethylene terephthalate).
3. The process of claim 1 wherein the thermoplastic polymer is poly(hexamethylene adipamide).
4. The process of claim 1 wherein the thermoplastic polymer is poly(acrylonitrile).
5. The process of claim 1 wherein the thermoplastic polymer is poly(oxymethylene).

References Cited
UNITED STATES PATENTS

| | | | |
|---|---|---|---|
| 3,245,944 | 4/1966 | Middleton | 260—33.4 |
| 3,227,674 | 1/1966 | Middleton | 260—33.4 |
| 3,153,004 | 10/1964 | Middleton | 260—33.4 |

SAMUEL H. BLECH, Primary Examiner

U.S. Cl. X.R.
260—230